(12) United States Patent
Katayama (10) Patent No.: US 7,457,583 B2
(45) Date of Patent: Nov. 25, 2008

(54) WATCHING METHOD OF BASEBALL USING MOBILE COMMUNICATION MEANS OF MOTION PICTURE

(75) Inventor: Muneomi Katayama, Tokyo (JP)

(73) Assignee: Kabushiki Kaisha Asobou's, Tokyo (JP)

( * ) Notice: Subject to any disclaimer, the term of this patent is extended or adjusted under 35 U.S.C. 154(b) by 330 days.

(21) Appl. No.: 11/200,005

(22) Filed: Aug. 10, 2005

(65) Prior Publication Data

US 2005/0283260 A1   Dec. 22, 2005

Related U.S. Application Data

(63) Continuation of application No. 10/140,442, filed on May 8, 2002, now Pat. No. 6,934,510.

(30) Foreign Application Priority Data

May 9, 2001  (JP)  ............................. 2001-138823

(51) Int. Cl.
*H04H 40/00* (2008.01)
(52) U.S. Cl. .................... 455/3.06; 455/414.2; 455/418; 455/457; 455/466; 455/509; 455/517; 455/899; 348/14.01; 348/157; 348/579; 725/61; 725/135
(58) Field of Classification Search ............... 455/3.06, 455/899, 414.2, 418, 457, 466, 509, 514, 455/517, 414, 2; 348/154, 157, 158, 579, 348/14.01, 14.02, 14.03, 14.05; 725/38, 725/51, 61, 98, 135
See application file for complete search history.

(56) References Cited

U.S. PATENT DOCUMENTS

| | | | |
|---|---|---|---|
| 5,953,056 A | 9/1999 | Tucker | |
| 6,115,612 A | 9/2000 | Fukuda | |
| 6,934,510 B2 * | 8/2005 | Katayama | ................. 455/3.06 |
| 2002/0133824 A1 | 9/2002 | Mensch | |
| 2002/0188943 A1 | 12/2002 | Freeman et al. | |

* cited by examiner

*Primary Examiner*—Matthew Anderson
*Assistant Examiner*—Shaima Q Aminzay
(74) *Attorney, Agent, or Firm*—Reed Smith LLP; Stanley P. Fisher, Esq.; Juan Carlos A. Marquez, Esq.

(57) ABSTRACT

A baseball game spectating method is composed of input means (score maker system) such as a mobile terminal capable of electronically inputting states of a baseball game successively, the step of successively inputting motions of players and the other information using the input terminal and transmitting their real-time data, filming means for filming the states of the baseball game, the step of encoding and transmitting the states of the baseball game, means for digitizing the input data and recorded image and sound data, a recording medium such as a data server for storing the digitized real-time data therein, a recording medium such as an image server for storing the digitized image therein, a recording medium such as a sound server for storing the digitized sounds therein, a mobile net system such as PDC or/and PHS and gateway and internet for converting protocol, and a mobile terminal such as a cellular phone with high function and high performance.

20 Claims, 12 Drawing Sheets

FIG. 23

WATCHING METHOD OF BASEBALL USING MOBILE COMMUNICATION MEANS OF MOTION PICTURE

CROSS-REFERENCE TO RELATED APPLICATIONS

This application is a Continuation application of U.S. application Ser. No. 10/140,442 filed on May 8, 2002 now U.S. Pat. No. 6,934,510. Priority is claimed based on U.S. application Ser. No. 10/140,442 filed on May 8, 2002, which claims priority to Japanese Patent Application No. 2001-138823 filed on May 9, 2001, all of which is incorporated by reference.

BACKGROUND OF THE INVENTION

1. Field of the Invention

The present invention relates to a baseball game spectating method using mobile image communication which records various data relating to a baseball game which is actually played and makes a link with desired various data upon request from a receiving end and outputs the desired data to a mobile terminal so as to display various information and images thereon.

2. Description of Related Art

In our country where sports flourish, one of the most common sports is baseball. In the baseball, particularly professional baseball of the Central League (common name is Ce League) and the Pacific League (common name is Pa League), and the annual high school baseball tournaments in spring and summer which are held in Hanshin Koshien Stadium every year charm not only players but also spectators.

As a conventional method of spectating baseball games, a method of actually going to a stadium and spectating games, and a method of spectating games via mass media such as radio and television are used. Moreover, recently as for television, there are various broadcasting means such as ground-based broadcasting which is conventional used and satellite broadcasting and cable television which are increasing. Accordingly, the methods of spectating baseball games are manifold.

However, most of the radio broadcasting sells live broadcasting from play ball to ending, but there is no means for providing information visually to a receiver. The radio broadcasting is not suitable for a receiver to obtain particularly various data such as batting average of a batter, earned run average of a pitcher which are important in the live broadcasting of baseball games when the receiver needs.

In addition, although the television broadcasting is advantageous to provide information visually to a receiver, it has the same problem as that of the radio broadcasting that the receiver cannot obtain necessary information when necessary. Moreover, the ground-based television broadcasting covers live games only within determined broadcasting time, and frequently the broadcasting is ended in the middle of the games. This problem is now being solved because various broadcasting means such as satellite live broadcasting and cable television increase. However, in order to enjoy this kind of service, an antenna should be set or a television set including a special tuner should be purchased, namely, this service has a disadvantage that receivers which can enjoy this service are limited.

SUMMARY OF THE INVENTION

It is an object of the present invention to provide a system which uses mobile terminals such as internet recently spreading and a cellular phone having high function and high performance and outputs desired data to the mobile terminals upon a request from a receiving end so as to be capable of suitably displaying various information and images thereon in forms of characters, graphics, or still and dynamic information.

A first aspect of the invention is to provide a baseball game spectating method using mobile image communication, including: input means (score maker system) such as a mobile terminal capable of electronically inputting states of a baseball game successively, the step of successively inputting motions of players and the other information using said input terminal and transmitting their real-time data; filming means for filming the states of the baseball game; the step of encoding and transmitting the states of the baseball game; means for digitizing the input data and recorded image and sound data; a recording medium such as a data server for storing the digitized real-time data therein; a recording medium such as an image server for storing the digitized image therein; a recording medium such as a sound server for storing the digitized sounds therein; a mobile net system such as PDC or/and PHS and gateway and internet for converting protocol; and a mobile terminal such as a cellular phone with high function and high performance, wherein various data are linked and are output to the mobile terminal upon a receiving end's request, and the various information and the images are displayed as character display, graphic display or still/dynamic information.

Another aspect of the invention is to provide the baseball game spectating method using mobile image communication depending from the above aspect wherein the various information and images which are output to and displayed on the mobile terminal such as a cellular phone are an output section of pitcher's actions, an output section of a batter and an output section of the other information; a at least one or a plurality of a clock section showing starting time and ending time of the game, a name or a part number of a pitcher at that time, a name or a part number of an opponent batter, a type and a speed of pitch such as curve, screwball or slider, a graphic of a strike zone which simultaneously makes type and speed of the pitch clear are displayed on suitable places in the output section of the pitcher's actions; at least one or a plurality of a diamond graphic showing names or part numbers of all fielders and a batter in predetermined positions, and output sections of strikeouts, mishit, hit, double, triple and home run are displayed on suitable places in the output section of the batter's actions; at least one or a plurality of names of both the teams in the game, names of the players including reserve players, a graphic of the scoreboard, count of strike, ball and out, and various data of the pitcher such as earned run average, strikeout average, the number of strikeouts, the number of pitches, the number of pitching innings, the number of hits, the number of home runs allowed, the number of walks per nine innings, a number of errors, past winning percentage, win, lose and results of meeting respective batters, various data of a batter such as batting average, the number of hits, the number of home runs, the number of RBIs, score, the number of walks allowed per nine innings and results of meeting respective pitchers are displayed on suitable places of the other information section.

Still another aspect of the invention is to provide the baseball game spectating method using mobile image communication depending from the above two aspects wherein: when the batter gains a base or move up a base due to hit, double, triple, home run, bases on balls, error, strikeout swinging and reaching first on a passed ball, wild pitch, passed ball or base steal, the name or the part number of the batter is displayed on a predetermined position of the diamond graphic; every time when base a runner reaches the home base, points are displayed on a predetermined place of the scoreboard graphic; when the third out is made before runners reach the home base, "0" is displayed automatically on a predetermined place of the scoreboard graphic.

On the whole, according to the present invention, the input means (score maker system) such as a mobile terminal is used to electronically input states of a baseball game successively, or the filming means is used to film the states, and the states are encoded and digitized so as to be used as data base. As a result, desired various data are linked upon a receiving end's request and are output to the mobile terminal so that the various information can be displayed suitably as character display, graphic display or still/dynamic information.

The present invention has another objects excellent structural characteristics and excellent effects, and they are made to be clear by the following embodiments. For the description of the present invention, i-mode (registered trademarks of NTT DoCoMo, Inc.) and i-apply (registered trademarks of NTT DoCoMo, Inc.) are used as examples of the mobile terminal, but needless to say, it is not limited to them.

Figure 1:
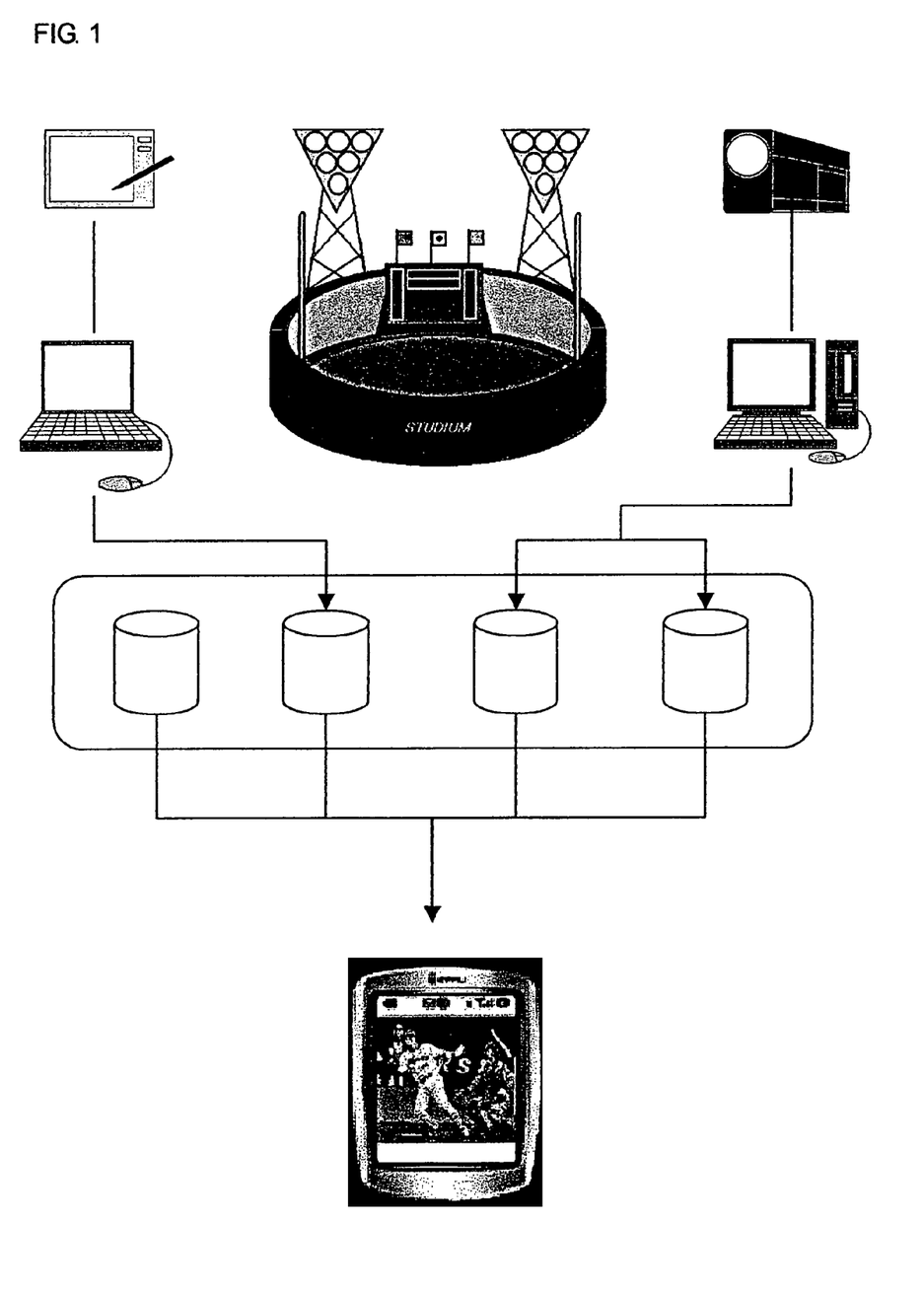
FIG. 1 is a flowchart showing an embodiment of the present invention.

DESCRIPTION OF THE PREFERRED EMBODIMENTS (1) in the drawing shows a baseball stadium where a baseball game is actually played. Moreover, (2) shows input means (score maker system) such as a mobile device which is capable of electronically inputting states of the baseball game sequentially. It is preferable that one or plural input means 2 are prepared in order to cover the states of the baseball game in detail or to cover so-called omissions of input and improve the accuracy.

In addition, (3) shows filming means for filming states of the baseball game. It is preferable that one or plural filming means are provided in order to cover the states of the baseball game in all directions or to provide boom shot for capturing real movements and states of players and capture notable player's every actions as zoom wide images.

Here, the input means (score maker system) 2 means a system for doing a so-called scorer's work electronically without using paper but using input means such as a mobile terminal. This system is characterized in that various information such as types of every pitch and results of the pitches (strike, ball, foul, hit, double, triple, home run) can be input according to independent conditions. This system includes filming of play ball through progression of the game using a camcorder or a digital camera including a digital video camera.

In addition, (4) in the drawing shows the step of digitizing and encoding real-time data and images collected by the input terminal, (5) shows a data server for storing the digitized real-time data, (6) shows an image server for storing the digitized image, (7) shows a sound server for storing the digitized sound, (8) shows a mobile net system such as PDC or/and PHS and a gateway and an internet for converting protocol, and (9) shows a mobile terminal such as a cellular phone having high function and high performance.

First Embodiment

A person who performs input brings the input means (2) to the baseball stadium (1) where a baseball game is actually played. The base ball game which has been actually played is firstly recorded on VTR and it is allowable to perform input while watching the VTR.

The input means (2) is actuated simultaneously with the announcement of the play ball. Not shown particularly, but since an input screen which is composed of an input section of a pitcher action, a butter and fielding input section and the other information section is displayed on a display section (10) of the input means (2), actions of every player such as types of each pitch according to game states and results of pitch number (strike, ball, foul, hit, double, triple, home run) and the other information are input according to independent conditions so that real-time data can be collected.

In such a manner, the input operation of pitcher's and batter's every action and their results in the baseball stadium is completed by inputting various data into the display section (10) of the input terminal (2) until the baseball game is ended or the necessary number of input times is ended.

In such a manner, the data are digitized and are transmitted to the data server (5) so as to be stored therein by the step (4) of transmitting the data.

At the same time, the filming means (3) is driven so as to start filming. Simultaneously, a sound is also started to be recorded by using sound recording means provided to the filming means. In order to link the images and sounds which are filmed and recorded in such a manner with the real-time data collected by the input means (2), it is desirable to provide a system which stores the filming and recording time and calls particular data and/or image based on the time.

As for a time compressing function, since a protocol of MPEG 2 (Moving Picture Experts Group 2) exists, the time compression of the information is carried out using this characteristic, link between the time and the images, a link between the time and the data and the like are combined so that the data information can be incorporated into broadcasting information.

Namely, in the MPEG 2, received frames are not successively decoded and time-compressed frames include I frames, P frames and predicted frames created by I and P frames.

For example, IBBP and received frames are decoded in the order of IPPB and after a P frame is firstly calculated, two B frames are calculated by using an I frame, and two B frames are created by using next I frame.

The above-mentioned processing technique of the frames are applied, namely, two basic data stream formats are processed by a software so that packet multi-transmission can be carried out. Moreover, the data into which closed-captioned text data are incorporated are transmitted to a user (receiver) with TS (Transform Stream) packet so that the user (receiver) can select desired data.

The recorded image and sound data are transmitted to the image server (6) where the digitized images are stored and the sound server (7) where the digitized sounds are stored so as to be stored therein via the step (4).

As for the various data which are collected respectively in the data server (5) for storing digitized real-time data therein, the image server (6) for storing digitized images therein and the sound server (7) for storing digitized sounds therein, desired data are output to the mobile terminal (9) such as a cellular phone with high function and high performance which is now spreading upon a receiving end's (user's) request via the mobile net systems such as PDC or/and PHS and the gateway and internet (8) for converting protocol. As a result, the various information, images and sounds can be displayed suitably as character display or graphic display or still/dynamic information.

In addition, The mobile net systems such as PDC or/and PHS and the gateway and internet (8) for converting protocol are provided also with a content data server (14) for storing profiles and additional data of players. The content data server (14) is linked with the various information, images and sounds as the need arises so that the content data as well as the various information, images and sounds can be displayed suitably on the mobile terminal (9) of the receiving end (user).

Further, the respective data of the data server (5), the image server (6), the sound server (7) and the content data server (14) are read directly via the mobile net systems such as PDC or/and PHS and via the gateway and internet (8) for converting protocol because the mobile terminal (9) such as a cellular phone with high function and high performance including "i-mode" and "i-apply" (registered trademarks of NTT DoCoMo, Inc.) is now spreading.

Second Embodiment

There will be explained below output concretely. When the receiver outputs data information, image data or sound data, the mobile terminal (9) is firstly actuated so that an output setting main menu (A) shown in FIG. 2 is displayed on a display.

Respective input keys for selecting as to whether desired information is game data (51), image data (52), sound data (53) or the other data (54) are arranged and displayed on suitable places. The receiver clicks a desired place.

Figure 2:
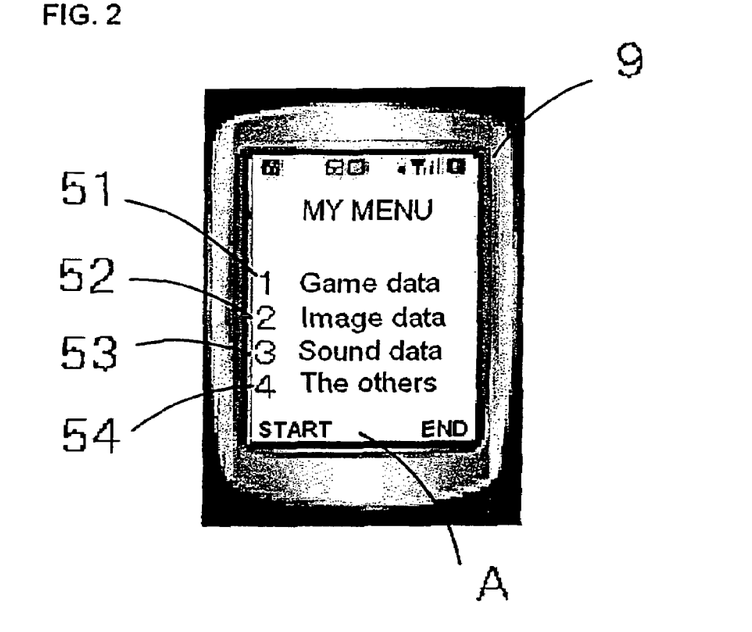
FIG. 2 shows one example of an output setting main menu which is output to a display of a hand-held terminal.
Figure 3:
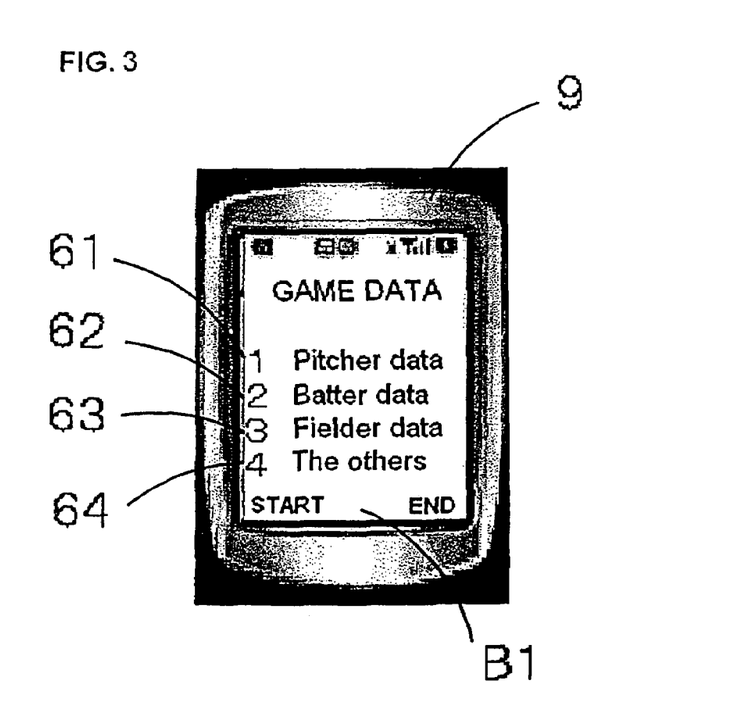
FIG. 3 shows an example 1 of an output setting sub-menu which is output to the display of the hand-held terminal.

In the case where the receiver selects and clicks the game data (51) in the output setting main menu (A) shown in FIG. 2, respective input keys of an output setting sub-menu (B1) for selection from pitcher data (61), batter data (62), fielder data (63) or the other data (64) are arranged and displayed on suitable places as shown in FIG. 3. The receiver clicks a desired place.

Figure 6:
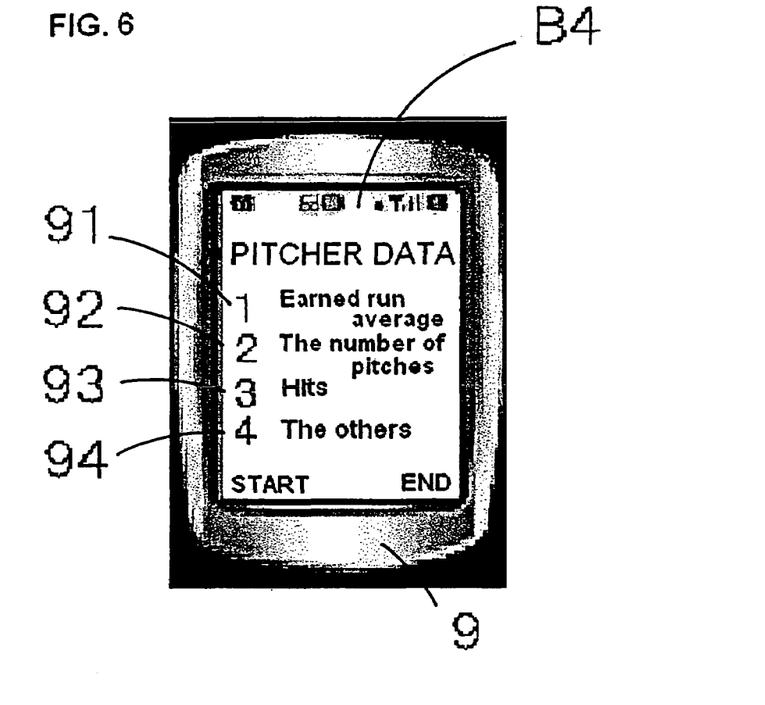
FIG. 6 shows an example 4 of an output setting sub-menu which is output to the display of the hand-held terminal.

When the receiver selects and clicks the pitcher data (61) in the output setting sub-menu shown in FIG. 3, respective input keys in an output setting sub-menu (B4) for selection from earned run average (91), the number of pitches (92), hits (93) or the others (94) are arranged and displayed on suitable places as shown in FIG. 6. The receiver clicks a desired place.

Figure 7:
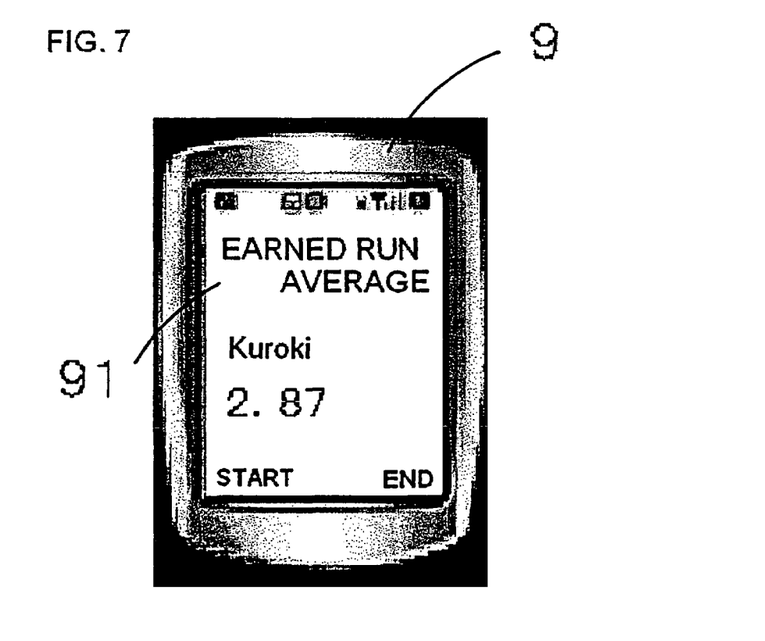
FIG. 7 shows an example 5 of an output setting sub-menu which is output to the display of the hand-held terminal.

When the receiver selects and clicks the earned run average (61) in the output setting sub-menu (B4) shown in FIG. 6, earned run average (91) of the pitcher currently in pitching is displayed on the display of the mobile terminal (9) owned by the receiver as shown in FIG. 7.

The output setting sub-menu (B4) sown in FIG. 6 preferably includes at least earned run average (91), the number of pitches (92), hits (93) and also, particularly not shown, the number of games that the pitcher comes in, the number of complete games, the number of shutout games, the number of complete games without BB, the number of victories, the number of loses, the number of saves, save point, winning percentage, batters faced, the carrier number of pitches, career opponents batting average, the number of home runs allowed, the career number of home runs allowed, the umber of strikeouts, the career number of strikeouts, strikeout average, career strikeout average, the number of base on balls, the career number of base on balls, the number of hit by pitch, the career number of hit by pitch, the number of wild pitches, the career number of wild pitches, the number of balks, the career number of balks, runs allowed, career runs allowed, earned runs, and career earned runs.

Figure 8:
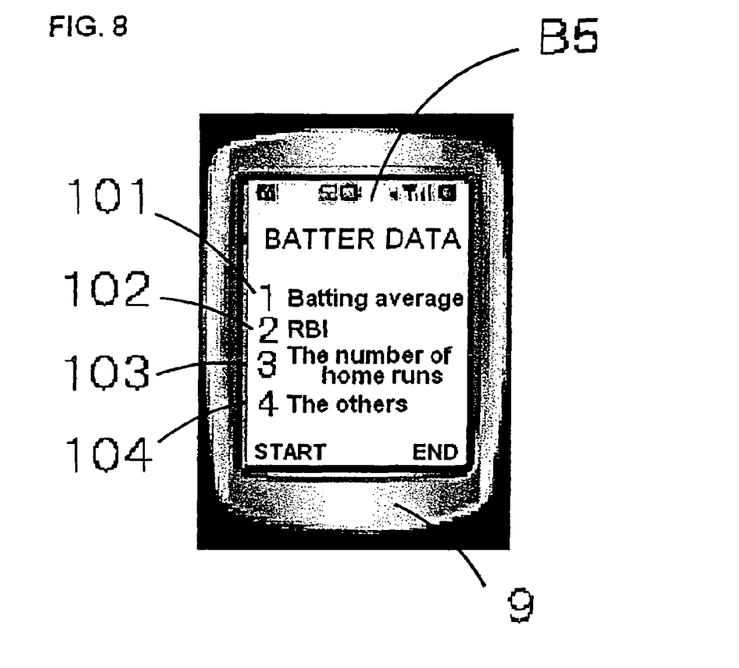
FIG. 8 shows an example 1 of data which are output to the display of the hand-held terminal.

Further, when the batter data (62) in the output setting sub-menu (B1) shown in FIG. 3 is selected and clicked similarly, respective input keys in an output setting sub-menu (B5) for selection from batting average (101), RBI (102), the number of home runs (103) and the others (104) are arranged and displayed on suitable places as shown in FIG. 8. The receiver clicks a desired place.

Figure 9:
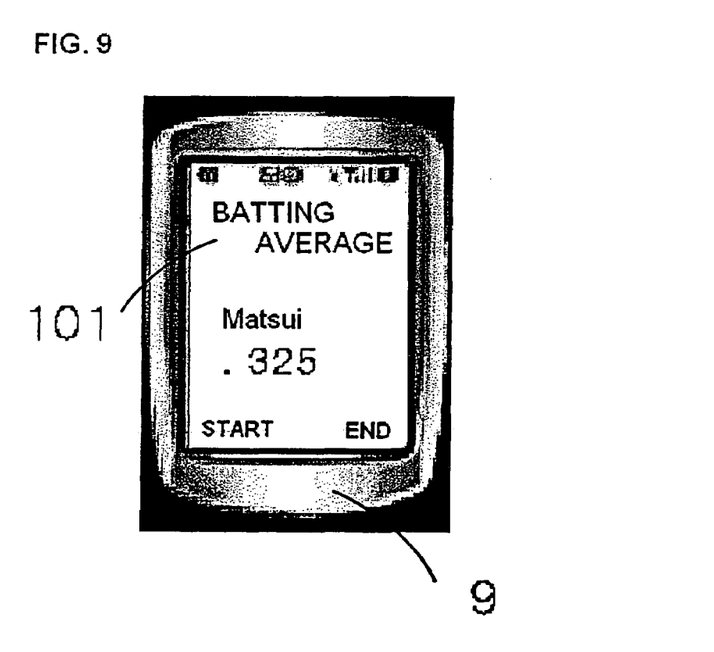
FIG. 9 shows an example 2 of data which are output to the display of the hand-held terminal.

When the receiver selects and clicks the batting average (101) in the output setting sub-menu (B5) shown in FIG. 8, the earned run average (91) of the pitcher currently in pitching in the game is displayed on the display of the mobile terminal (9) owned by the receiver as shown in FIG. 9.

The output setting sub-menu (B5) show in FIG. 8 preferably includes at least batting average (101), RBI (102), the number of home runs (103), and also particularly not shown, Batting Average with Runners in Scoring Position, the number of game played, plate appearance, at bats, points, the number of hits, the number of doubles, the number of triples, total bases, the number of strikeouts, the number of walks, the number of hit by pitch, the number of sacrifice hits, the number of sacrifice flies, the number of stolen bases, the number of ground into double plays (including triple play), on-base percentage, and slugging average.

Figure 10:
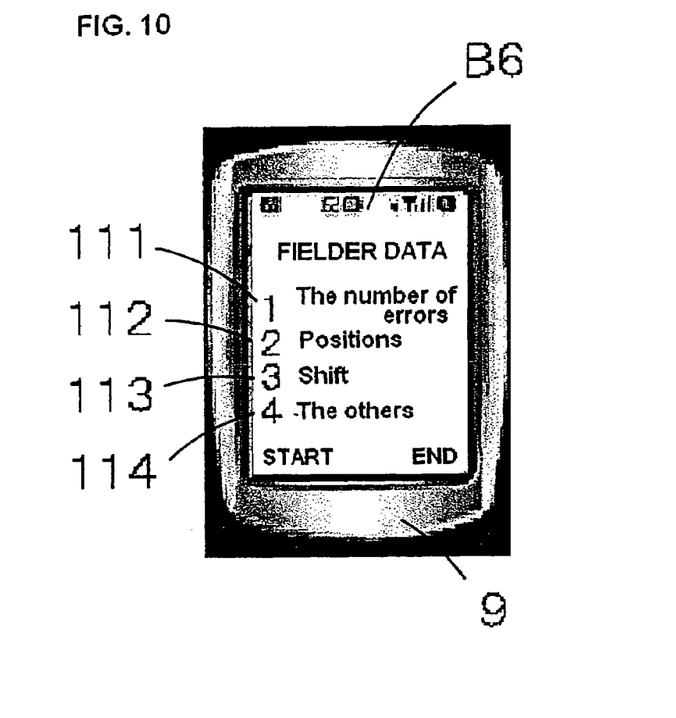
FIG. 10 shows an example 6 of an output setting sub-menu which is output to the display of the hand-held terminal.

When the receiver selects and clicks the fielder data (63) in the output setting sub-menu (B1) shown in FIG. 3 similarly, respective input keys in an output setting sub-menu (B6) for selection from the number of errors (111), position (112), shift (113) and the others (114) are arranged and displayed on suitable places as show in FIG. 10. The receiver clicks a desired place.

Figure 11:
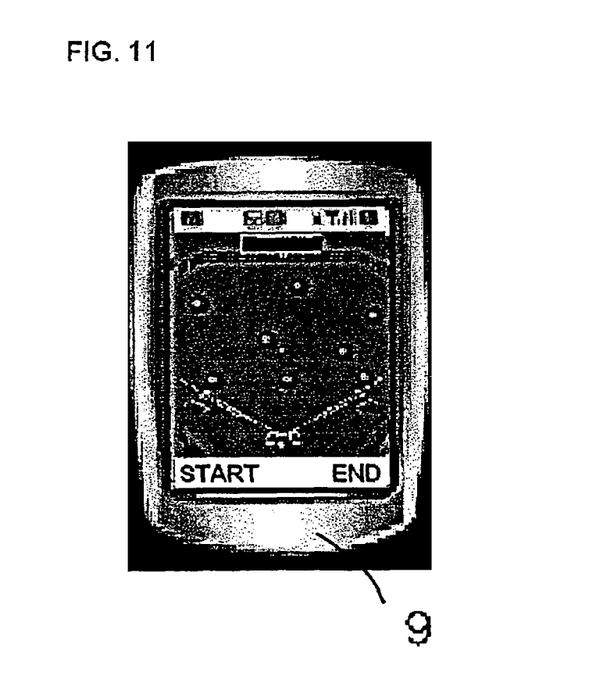
FIG. 11 shows an example 3 of data which are output to the display of the hand-held terminal.

When the receiver selects and clicks shift (113) in the output setting sub-menu (B6) shown in FIG. 10, shift disposition (113) of the current game is displayed on the display of the mobile terminal (9) owned by the receiver as shown in FIG. 11.

Third Embodiment

There will be explained below the outputs of the image data concretely. As shown in FIG. 2, the image data (52) in the output setting menu (A) output to the mobile terminal (9) are selected and clicked there.

Figure 4:
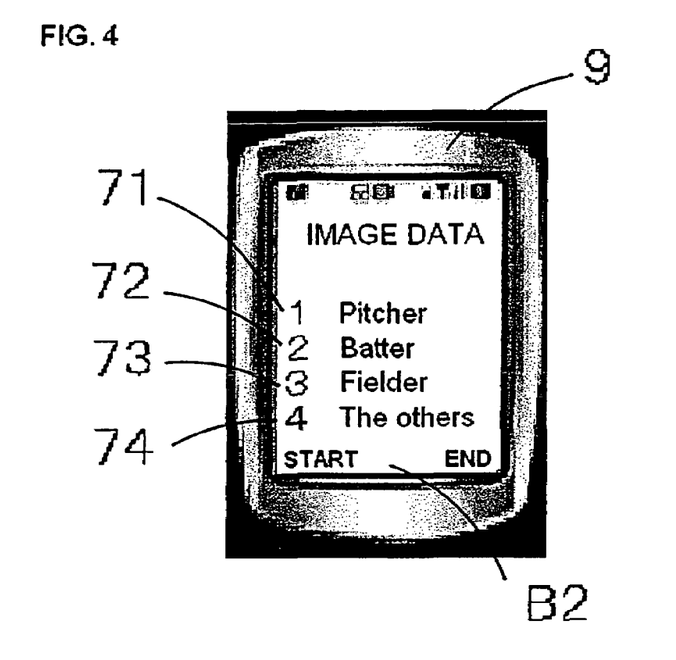
FIG. 4 shows an example 2 of an output setting sub-menu which is output to the display of the hand-held terminal.

In this case, as shown in FIG. 4, the respective input keys of the output setting sub-menu (B2) for selection from pitcher (71), batter (72), fielder (73) and the other (74) are arranged and displayed on the suitable places. The receiver clicks a desired place.

Figure 12:
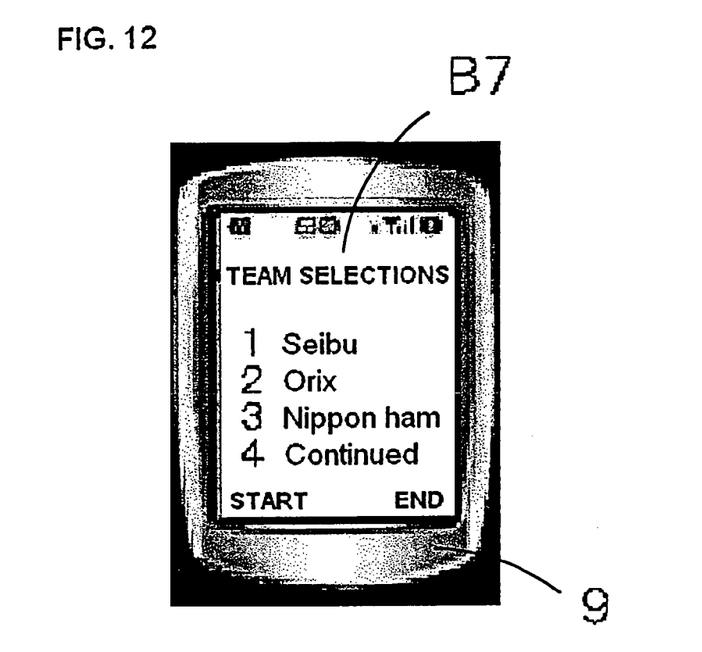
FIG. 12 shows an example 7 of an output setting sub-menu which is output to the display of the hand-held terminal.
Figure 13:
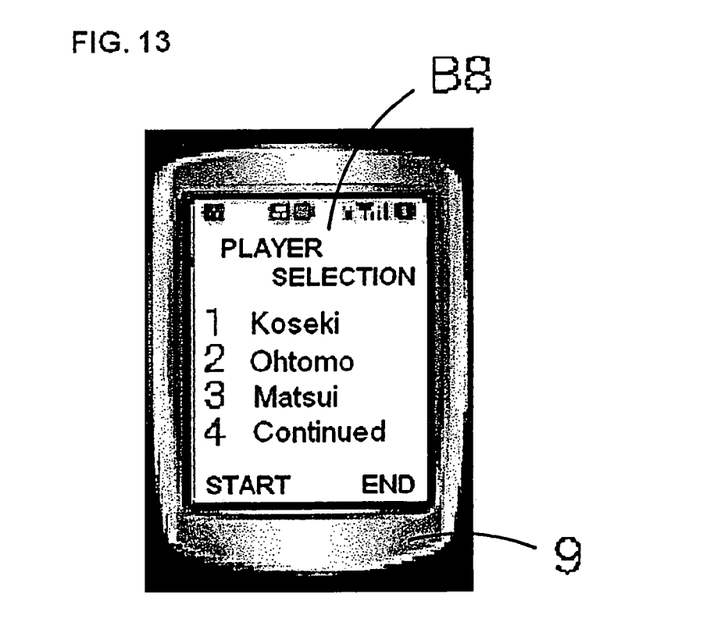
FIG. 13 shows an example 8 of an output setting sub-menu which is output to the display of the hand-held terminal.
Figure 14:
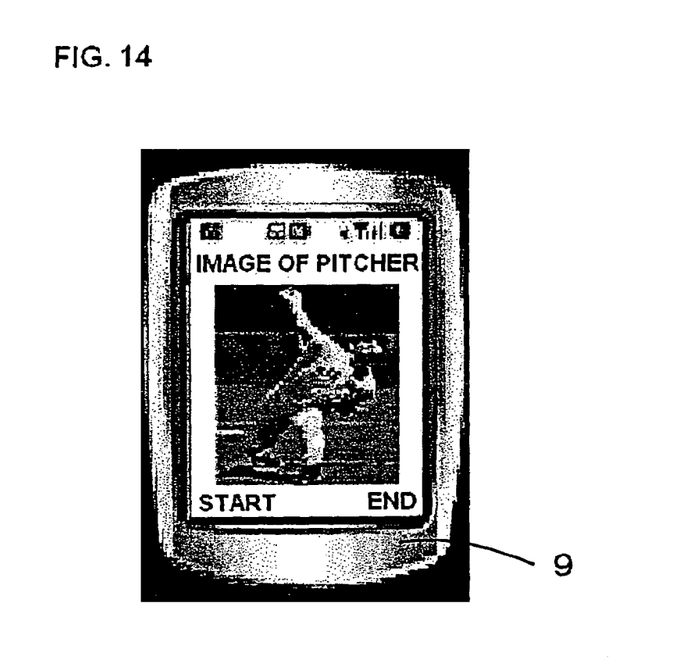
FIG. 14 shows an example 4 of data which are output to the display of the hand-held terminal.
Figure 15:
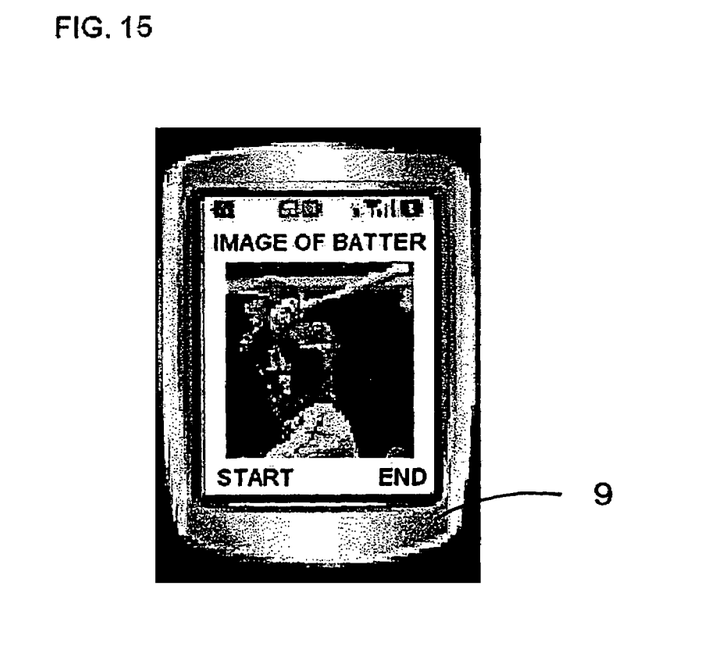
FIG. 15 shows an example 5 of data which are output to the display of the hand-held terminal.
Figure 16:
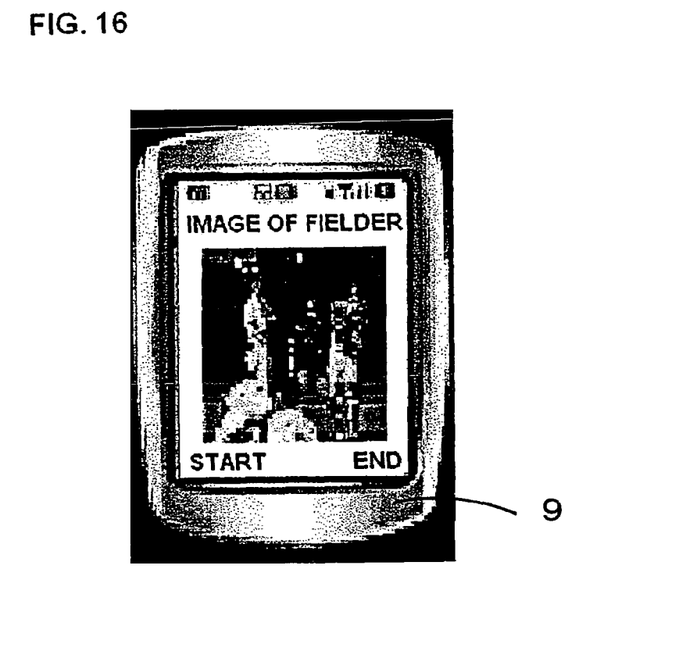
FIG. 16 shows an example 6 of data which are output to the display of the hand-held terminal.

As shown in FIG. 12, respective input keys in an output setting sub-menu (B7) for selection of a team are arranged and displayed on suitable place, and when input is performed, respective input keys in an output setting sub-menu (B8) for selection of a player are arranged and displayed on suitable places as shown in FIG. 13. Images composed of dynamic display, still display or their combination are output as shown in FIGS. 14 through 16 by clicking a desired place.

Fourth Embodiment

There will be explained below output of the sound data concretely. As shown in FIG. 2, the sound data (53) in the output section main menu (A) output to the mobile terminal (9) is selected and is clicked.

Figure 5:
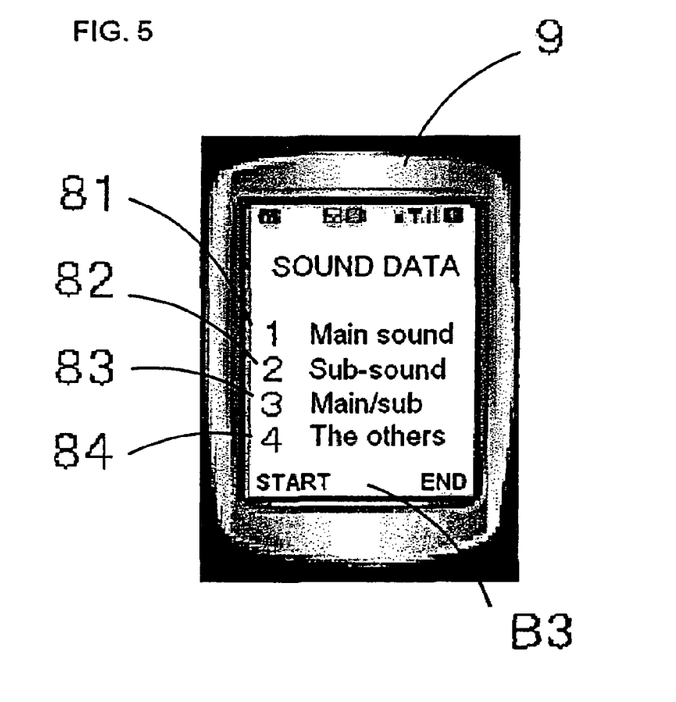
FIG. 5 shows an example 3 of an output setting sub-menu which is output to the display of the hand-held terminal.
Figure 17:
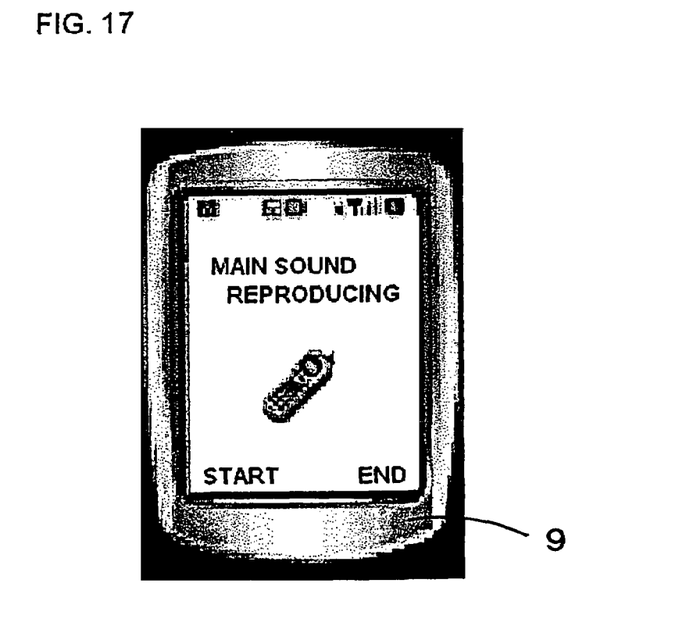
FIG. 17 shows one example of a waiting screen which is displayed on the display of the hand-held terminal.
Figure 18:
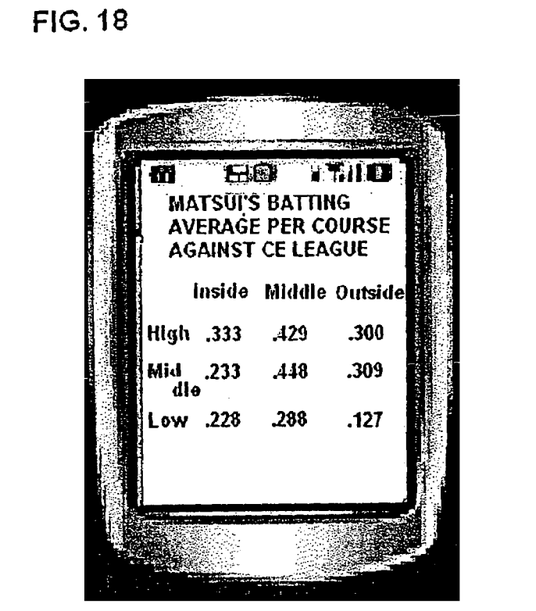
FIG. 18 shows an example 1 of matchup result data which are output to the display of the hand-held terminal.

In this case, as shown in FIG. 5, respective input keys in an output setting sub-menu (B3) for selection from main sound (81), sub-sound (82), main/sub-sound (83) and the others (84) are arrange and displayed on suitable places The receiver clicks a desired place. While sound output, a waiting screen shown in FIG. 17 is displayed on the display of the mobile terminal (9), but the present invention can be carried out without this.

The various data and the image data and the sounds are linked and they can be suitably output together to the mobile terminal (9) of the receiving end (user) as the need arises.

Fifth Embodiment

The information output in such a manner is shown in FIGS. 18 through 23, and the information will be further detailed. Besides the various data which are output as the output sections of the pitcher's actions, it is preferable that at least a clock section which shows the starting time and the ending time of the game, display of inning, display of first half or second half of inning, name or part number of the pitcher in currently pitching, name or part number of opponent batter, type and speed of pitch such as curve, screwball and slider, a graphic of a strike zone showing stuff that simultaneously makes type and speed of the pitch clear, a diamond graphic showing the baseball ground, and current score and score board are arranged and displayed on suitable places.

Further, the output sections of the batter actions, besides the various data which have been output before, it is preferable that at least a diamond graphic which shows names or part numbers of all the fielders and the batter on predetermined positions, and output sections of strikeouts, mishit, hit, double, triple and home run are arranged and displayed on suitable places.

Further as for the other information sections, besides the various data which have been output before, it is preferable that at least names of the opponent teams in the game, names of the players including reserve players, a graphic of the scoreboard, count of strike, ball and out, and various data of the pitcher such as earned run average, strikeout average, the number of strikeouts, the number of pitches, the number of pitching innings, the number of hits, the number of home runs allowed, the number of walks per nine innings, the number of errors, past winning percentage, win, lose, and results of meeting respective batters, and various data of a batter such as batting average, the number of hits, the number of home runs, the number of RBIs, score, the number of bases on balls, results of meeting respective pitchers are arrange and displayed on suitable places.

As the game proceeds, when the batter get a base or moves up a base due to hit, double, triple, home run, bases on balls, error, strikeout swinging and reaching first on a passed ball, wild pitch, passed ball or base steal, the name or the part number of the batter is displayed on a predetermined position of the diamond graphic. Every time when a base runner reaches the home base, the points are displayed on a predetermined place of the scoreboard graphic. When the third out is made before the runner reaches the home base "0" is preferably displayed automatically on a predetermined place of the scoreboard graphic.

Further, at this time it is preferable that a line (131) is automatically drawn between a position to which a ball batted by the batter flies and a home plate in the diamond graphic (128).

In addition, the image data (52) which are output according to the above-mentioned procedure are set preferably so that an image composed of dynamic image, still image or their combination can be displayed on a part of the display or the entire display.

Figure 19:
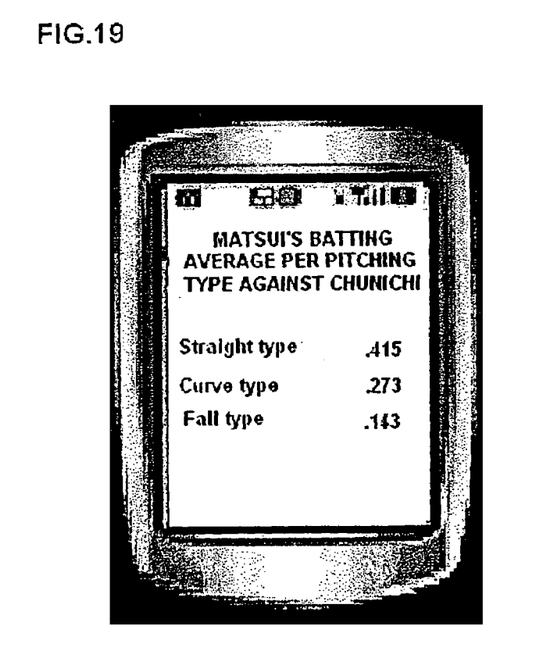
FIG. 19 shows an example 2 of matchup result data which are output to the display of the hand-held terminal.
Figure 20:
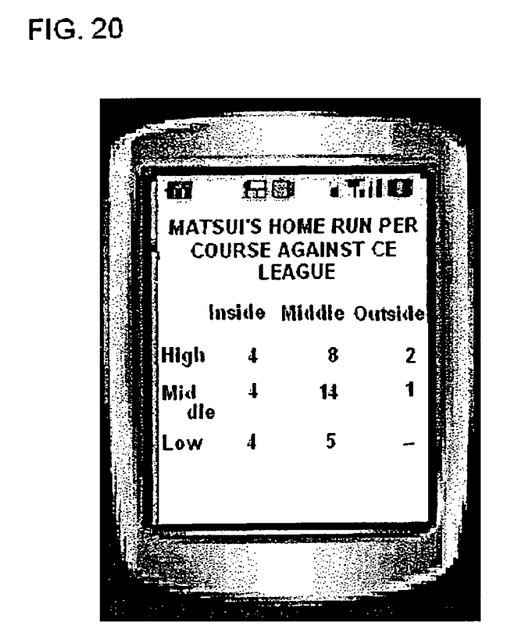
FIG. 20 shows an example 3 of matchup result data which are output to the display of the hand-held terminal.
Figure 21:
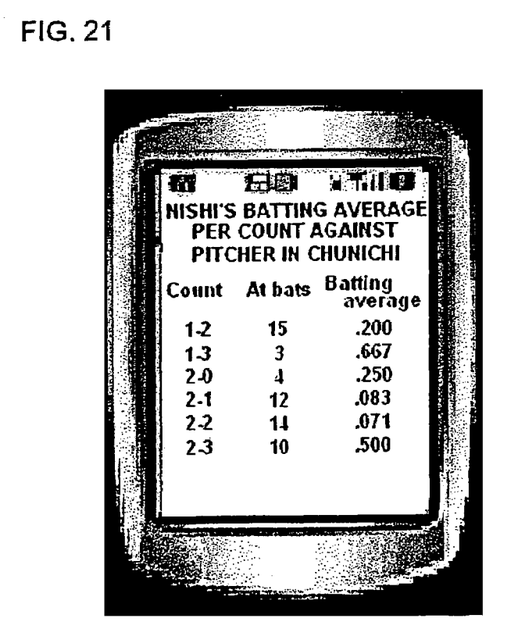
FIG. 21 shows an example 4 of matchup result data which are output to the display of the hand-held terminal.
Figure 22:
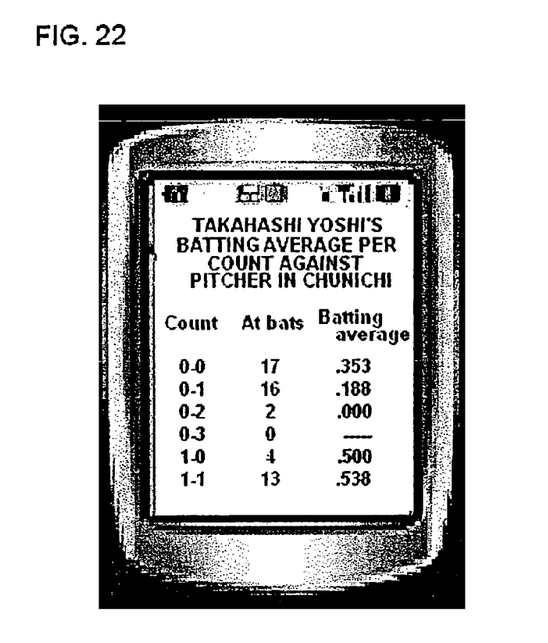
FIG. 22 shows an example 5 of matchup result data which are output to the display of the hand-held terminal.
Figure 23:
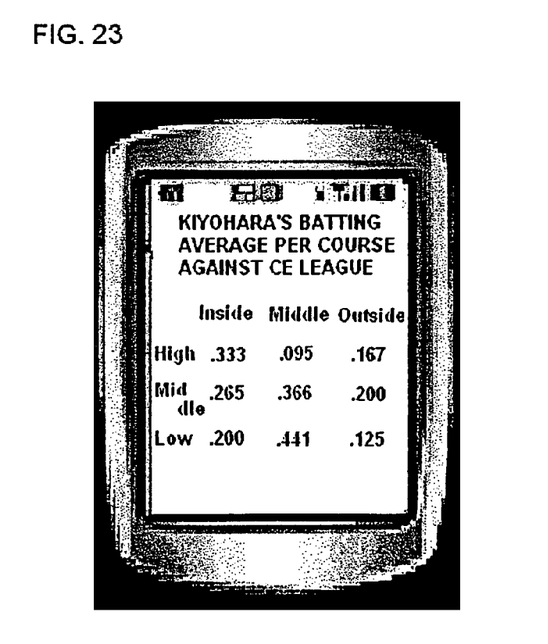
FIG. 23 shows an example 6 of matchup result data which are output to the display of the hand-held terminal.

Furthermore, it is preferable that, for example, the image data (52) which are composed of the output dynamic display, still display or their combination are set so that images of opponent pitcher and batter are taken out and are arranged without overlapping and their expressions and actions are displayed simultaneously as shown in FIG. 19.

As mentioned above, the present invention produces the effect that with the use of the mobile terminal such as a cellular phone owned by the receiver, the receiver who is unskillful at a computer can be provided with information easily and the operation becomes very simple. Moreover, since the equipment used to carry out the present invention is not necessarily a special equipment, when a baseball game is not ordinarily broadcasted, the mobile terminal can be used for conventional purposes, namely, it is reasonable.

In addition, since the receiver can be provided with information in the receiver's desirable place, it is not necessary to take the time to watch a broadcasting game in a baseball stadium where the game is actually played or on TV.

Further, even in the case of important games such as matchup of the top two teams or Japan series which is forgotten absently, since the information can be provided on the spot, the receiver never miss the game and thus does not regret it.

Needless to say, the present invention may be used while watching a broadcasting game in a baseball stadium where the game is played actually or on TV. In this case, since the receiver can be provided with desirable information, the present invention contributes to taking enjoyment in the game.

On the whole, it is the effect of the present invention is that internet which is now spreading and the mobile terminal such as a cellular phone with high performance and high function are used and desired data are output to the mobile terminal upon a receiving end's request so that various information and images relating to a baseball game desired by the receiver can be displayed suitably as character display, graphic display, or still/dynamic information.

What is claimed is:

1. A sports spectating method using mobile image communication, comprising:
    inputting states of the sports sequentially into at least one mobile communication device in a real-time manner, said states including images and textual description of motions of players;
    digitizing the real-time data;
    transmitting the digitized data of the sports via a mobile net system or internet to another mobile communication device as requested; and
    displaying on said another mobile communication device the transmitted data of the sports.

2. A sports spectating method using mobile image communication, comprising:
    filming the sports live;
    textually inputting states of the sports sequentially into at least one mobile communication device in a real-time manner, said states including motions of players;
    digitizing the real-time data including input data and filmed image and sound data;
    transmitting the digitized data of the sports via a mobile net system or internet to one mobile communication device as requested; and
    displaying on the mobile communication device the transmitted data of the sports as characters, graphics or images.

3. The sports spectating method according to claim 2, wherein the real-time data includes at least one of scores of the sports, a starting time and an ending time of the sports, a name or an ID number of each player, a graphic of a playing field, images of scoreboard, a past winning percentage of teams, past performance data of the players.

4. The sports spectating method according to claim 3, wherein the sports is baseball, and the real-time data further includes a batter's or a pitcher's action, a type and a speed of a pitch, a graphic of a strike zone, names or ID numbers of all fielders, and strikeouts, mishits, hits, doubles, triples and home runs, names of both teams in the sports, names of players including reserve players, count of strike, ball and out of the pitcher, an earned run average and an strikeout average of the pitcher, a number of strikeouts, a number of pitches, a number of pitching innings, a number of hits, a number of home runs, a number of walks per each inning, a number of errors, past performance data of batters, a number of walks allowed per nine innings, and past performance data of pitchers.

5. The sports spectating method according to claim 4, wherein
    when the batter gains a base or moves up a base due to a hit, double, triple, home run, bases on balls, error, strikeout, swinging and reaching first on a passed ball, wild pitch, passed ball or base steal, the name or the ID number of the batter is displayed on the mobile communication device.

6. The sports spectating method according to claim 4, wherein every time when a base runner reaches the home base, points are displayed on a scoreboard graphic on the mobile communication device.

7. The sports spectating method according to claim 4, wherein when a third out is made before runners reach the home base, "0" is displayed automatically on a scoreboard graphic on the mobile communication device.

8. The sports spectating method according to claim 2, wherein the mobile net system complies with at least one of Personal Digital Cellular phone standard (PDC) and Personal Handyphone System (PHS).

9. The sports spectating method according to claim 2, wherein the mobile communication device is a cellular phone or a personal digital assistant (PDA).

10. The sports spectating method according to claim 4, wherein the types of a pitch include a curve, screwball and slider.

11. The sports spectating method according to claim 4, wherein the graphic of a strike zone is displayed simultaneously with the type and the speed of the pitch to better show the pitcher's actions.

12. The sports spectating method according to claim 3, wherein at least one graphic is shown on the mobile communication device to display names or ID numbers of selected players in predetermined positions.

13. The sports spectating method according to claim 4, wherein the strikeouts, mishits, hits, doubles, triples and home runs are displayed to show the batter's actions.

14. The sports spectating method according to claim 4, wherein the past performance data of batters include a batting average, a number of hits, a number of home runs, and a number of run batted in (RBI).

15. The sports spectating method according to claim 2, wherein the sports is filmed with a tape recorder, a camcorder, a digital camera, or the mobile communication device.

16. The sports spectating method according to claim 2, further comprising encoding the digitized data of the sports in a format for transmitting via the mobile net system or the internet.

17. A sports spectating system using mobile image communication, comprising:
    at least one mobile communication device that inputs states of the sports sequentially in a real-time manner, said states including images and textual description of motions of players, digitizes the real-time data; transmits the digitized data of the sports via a mobile net system or internet to another mobile communication device as requested; and
    said another mobile communication device displays the transmitted data of the sports thereon.

18. A sports spectating system using mobile image communication, comprising:

a camera for filming a sports live;

at least one mobile communication device that textually inputs states of the sports sequentially in a real-time manner, said states including motions of players;

a server for digitizing the real-time data from said camera and said mobile communication device and for transmitting the digitized data of the sports via a mobile net system or internet to another mobile communication device as requested; and said another mobile communication device displays the transmitted data of the sports thereon.

19. The sports spectating system according to claim 18, wherein said camera is a stand-alone type or embedded in said mobile communication device.

20. The sports spectating system according to claim 18, wherein the mobile communication device is a cellular phone or a personal digital assistant (PDA).

* * * * *